United States Patent [19]

Stjärne

[11] 4,378,864
[45] Apr. 5, 1983

[54] RAILWAY VEHICLE BRAKE BLOCK HOLDER

[75] Inventor: Anders O. G. Stjärne, Löddeköpinge, Sweden

[73] Assignee: SAB Nife AB, Landskrona, Sweden

[21] Appl. No.: 141,047

[22] Filed: Apr. 17, 1980

[30] Foreign Application Priority Data

Apr. 20, 1979 [SE] Sweden .................................. 7903480

[51] Int. Cl.³ ............................................. B60T 11/04
[52] U.S. Cl. ................................................. 188/153 R
[58] Field of Search .......... 188/153 R, 153 A, 153 D, 188/206 R

[56] References Cited

U.S. PATENT DOCUMENTS

| 2,940,553 | 6/1960 | Newell et al. | 188/153 R |
| 3,280,945 | 10/1966 | Spalding | 188/153 R |
| 3,330,387 | 7/1967 | Newell | 188/153 R |
| 3,989,126 | 11/1976 | Katzer | 188/206 R |

Primary Examiner—Hiram H. Bernstein
Attorney, Agent, or Firm—Laurence R. Brown

[57] ABSTRACT

A railway vehicle brake block holder (11) for a brake unit (1) with brake block hangers (9) pivotally attached to a fixed part (8) of the unit and to the brake block holder.

In order primarily to obtain a very compact design the brake block hangers (9) are pivotally attached to the lower part of the brake block holder (11) and to brackets (8) on the unit constituting a lateral guiding for the holder. The two hangers (9) together with two inserts (13) are held together as a strong yoke by a screw (12). Means (14–18, 22, 23) are provided for obtaining a self-adjusting force transmitting connection between the only axially movable brake unit push rod (3) and the brake block holder (11).

9 Claims, 3 Drawing Figures

RAILWAY VEHICLE BRAKE BLOCK HOLDER

TECHNICAL FIELD

This invention relates to a railway vehicle brake block holder, preferably for a brake unit, with means for its suspension, including brake block hangers pivotally attached to a fixed part, preferably a bracket, of the brake unit and to the brake block holder, and with means for connection to a brake force applying push rod.

BACKGROUND ART

A railway vehicle brake block holder is intended to act as a mounting means for a brake block or brake shoe, which transmits a braking force to a wheel of the vehicle and is replaced after having been worn out.

The brake block holder is conventionally suspended at its center as viewed from the side, preferably by means of brake block hangers, and the brake force is normally also applied to the brake block holder center, for example by means of a push rod.

In the case of brake units the pivotable brake block hangers are normally suspended from the brake unit or brackets thereon and are, as said, pivotally attached to the center of the brake block holder. Typical examples of such arrangements are found in U.S. Pat. Nos. 2,940,553, 3,430,740 and 3,707,208. A solution to the problem at such arrangements of applying the brake force from an only axially movable push rod to the center of the brake block holder moving along an arc during a brake application is shown in U.S. Pat. No. 3,572,475.

The available space at a railway vehicle wheel is often very limited, and it is therefore of upmost importance to keep the external dimensions of the arrangement at a minimum. The conventional solution with brake block hangers extending upwards from the center of the brake block holder past the whole holder to a fixed part of or a bracket on the brake unit housing is not optimal in this respect, especially if the brake unit itself is compact and a special bracket extending out from the unit is required for the brake block holder suspension.

DISCLOSURE OF THE INVENTION

A far better solution to the problem of obtaining a compact brake block holder suspension fulfilling also all other requirements is according to the invention attained in that, from its pivotal attachment to the fixed part of the brake unit, each brake block hanger extends considerably past the center of the brake block holder as viewed from the side to its pivotal attachment to the brake block holder, whereas the connection between the push rod and the brake block holder is substantially at or near said center in a way known per se.

The whole suspension may thus advantageously be arranged within the height of the brake block holder itself, i.e. if the pivotal connection between the brake block holder and the hangers is at the lower part of the holder, whereas the pivotal connection between the hangers and the fixed part of the brake unit is at the upper part of the holder. In this solution the length of the hangers is as required in order not to give a too small arc for the brake block holder movement. No part of the suspension arrangement thus need to extend past the brake block holder in a side view.

An advantageous practical solution is obtained if the brake block holder is arranged between two brackets extending out from the brake unit and if the two brake block hangers are arranged outside of said two brackets, as in such a case the brake block holder will be laterally guided by the brackets, especially if the lateral forces are high, and as it will be very easy to mount the hangers to the brackets and the holder from the outside.

In conventional designs each brake block hanger is pivotally attached to the brake block holder, and there are no means for taking up the forces acting on it during a brake application. In the present case the brake block hangers, that are identical but inverted, are held together by a screw in two cylindrical inserts, which are fixed to the brake block hangers, extend through a hole in the brake block holder, and abut each other when mounted.

The design so far described has the following advantages (besides the basic advantage of being less space consuming than earlier known designs) that the mounted suspension consisting of the hangers, the two inserts and the screw holding them together forms a strong yoke well capable of taking up forces, especially torsional forces acting thereon. Also, the two inserts joined by the screw will take up all the forces from the brake block holder.

As already said, the force transmitting connection between the push rod and the brake block holder is at or near the center of the brake block holder. The push rod is normally only axially movable, whereas the brake block holder due to its suspension will move along an arc. This means that relative movements between these two parts must be admitted. For that reason a curved cradle is attached in the rear part of the brake block holder. In the cradle is arranged a force transmitting member having a front surface with a shape corresponding to the cradle (or in other words an arcuate shape) and a flat back surface for force receiving cooperation with a push plate attached to the end of the push rod.

The force transmitting member will be self-adjusting relative to the cradle and the push plate due to the fact that the center of the cradle arc and thus of the front surface of the force transmitting member lies behind the push plate or at the side of the push plate opposite its surface in contact with the force transmitting member.

It should be noted that due to the flat surfaces of the push plate and the force transmitting member in the cradle relative movements, above all lateral movements, will be permitted.

In order to ensure that the force transmitting member does not move except under the influence of relatively high forces there are means for frictionally keeping the force transmitting member in place in the cradle. These means comprise plungers in through bores in said member, the plungers being biased by springs into engagement with flat side walls in the brake block holder.

It is important to keep the brake block holder in the right position relative to the wheel with which it is to cooperate and also relative to the push rod (substantially perpendicular to the push rod). It is further desirable to prevent the force transmitting means from moving under the influence of shocks, vibrations and similar forces, which could give rise to undesired wear from the friction means. This is attained in that there is a resilient elongated holding means, preferably a bundle of leaf springs, abutting spaced apart support means in the brake block holder with its ends and the push plate with its central part. The force from the friction means is higher than that from the leaf springs (which give a certain internal damping). Preferably the bundle of leaf springs extends through an axial slot in the push rod. The support means are preferably clamps in the vicinity of the ends of the cradle.

In this way a play-free device will be obtained, and the desired take-up of the torques and forces will be obtained in the spring or springs during braking.

It is to be noted that the clamps are somewhat wider than the leaf spring giving a certain freedom of movement or play.

As already indicated the design with the cradle, the force transmitting member and the leaf springs is especially well suited for the case with an only axially movable push rod. However, the same design (with the possible exception of the slidable connection between the push rod and the force transmitting member) may be used if the push rod is able to move somewhat laterally and not only axially.

The brake block holder according to the invention is, as said, preferably to be used together with a brake unit, and it is most advantageous if the brake unit itself is of small outside dimensions. The invention is, however, equally applicable to brake block holders used separately and actuated by a push rod in a separate brake rigging of any suitable kind.

BRIEF DESCRIPTION OF DRAWINGS

The invention will be described in further detail below reference being made to the accompanying drawings, in which.

DETAILED DESCRIPTION OF A PREFERRED EMBODIMENT

Figure 1:
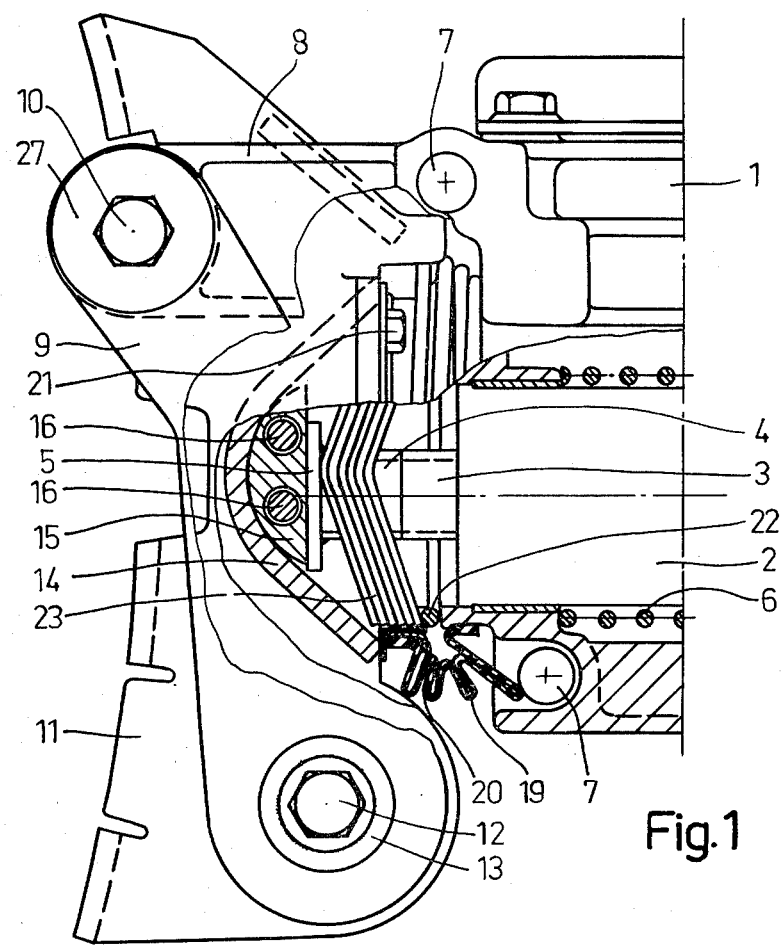
FIG. 1 is a side view, partly in section, of a brake block holder suspension according to the invention on a brake unit (only shown in part)
Figure 2:
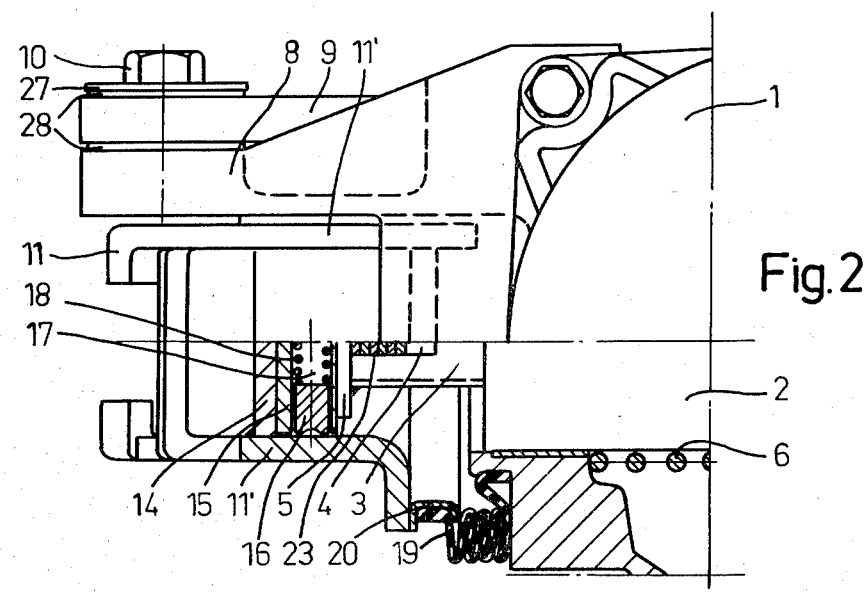
FIG. 2 is a top view, partly in section (lower part), of the same device.

A conventional brake unit 1 is in the shown case of the type having not shown means for transforming a certain movement of a not shown piston under the action of a fluid under pressure admitted thereto into a movement perpendicular thereto of a sleeve 2, preferably containing a slack adjuster of any conventional kind. Of the slack adjuster only a threaded spindle 3, which is only axially movable and below is called a push rod, is shown and extends out of the brake unit 1.

The push rod 3 is near its end provided with an axial slot 4 for a purpose to be described. A push plate 5 is attached to the push rod 3. A return spring 6 for the sleeve 2 is arranged around the same and acts with its shown, left hand end on the brake unit housing and with its right hand end on a not shown abutment on the sleeve 2. The brake unit 1 is provided with holes 7 for the mounting of the brake unit to a suitable, not shown part of a rail vehicle underframe in the vicinity of a not shown wheel.

The brake unit 1 is provided with two fixed suspension brackets 8 extending forward in the same general direction as the spindle 3.

A brake block hanger 9 is pivotally attached to each of these brackets 8 by means of a bracket screw 10. A special journal and sealing arrangement at the pivotal connection between the members 8–10 is shown in the upper left part of FIG. 3. It consists of a hanger bushing 25, pressed into the hanger 9, a bushing 26, a washer 27, and two sealing rings 28.

A brake block holder 11 with conventional, not further described means for releasably mounting of a not shown brake block or brake shoe is pivotally attached to the brake block hangers 9 by means of a common brake block holder screw 12 in inserts 13 in the brake block hangers 9. These inserts 13 are serrated at their ends abutting each other and are pressed into engagement with their respective hanger 9.

Figure 3:
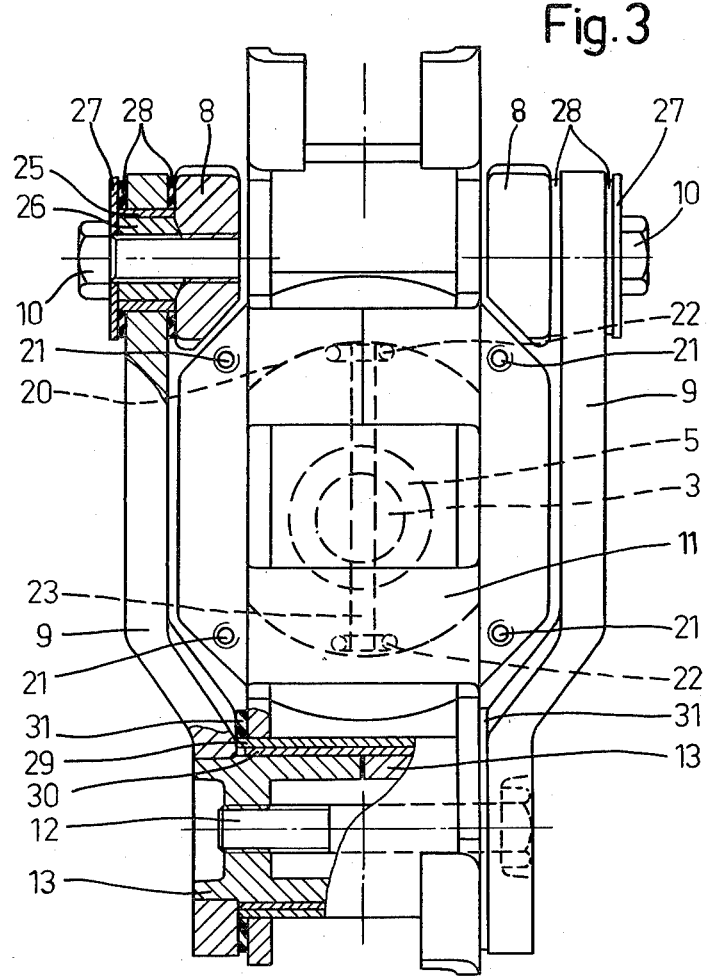
FIG. 3 is a front view, partly in section, of the same device.

Also in this case a special journal and sealing arrangement as shown in the lower part of FIG. 3 is provided at the pivotal connection between the members 11 and 13. It consists of a holder bushing 29 pressed into a corresponding hole in the holder 11, a journal bushing 30 and sealing rings 31.

It is to be noted that the connection between the brake block hangers 9 and the brake block holder 11 is at the lower part of the brake block holder 11, which primarily extends upwards between the brake block hangers 9, as appears clearly in FIGS. 1 and 3.

Between the two side-walls 11' of the brake block holder 11 is welded an inner wall 14 in the form of a "cradle". A force transmitting member 15 has a front surface with an arcuate shape corresponding to the shape of the cradle 14, a flat back surface for engagement with the push plate 5 and a flat side surface near the brake holder side-walls 11'. The center of said arc lies to the right of the push plate 5 as viewed in FIG. 1, thus making the force transmitting member 15 self-adjusting.

In order to hold the force transmitting member 15 frictionally in place in the formed cradle plungers 16 in through bores 17 in the member 15 are pressed apart against the side-walls 11' by means of helical compression springs 18.

A rubber bellows 19 for preventing the intrusion of moist, dirt and the like is arranged between the brake unit 1 and a cover 20, which is attached to the brake block holder 11 by means of screws 21. In the cover 20 are attached (for example by welding) two diametrically opposed U-shaped clamps 22, which are both indicated in FIG. 3 but of which only one is visible in FIG. 1.

A bundle of leaf springs 23, bent to an open V-shape as appears from FIG. 1, is arranged between the two clamps 22 and extends through the axial slot 4 in the adjuster spindle 3 and is in contact with the push plate 5 attached to the push rod 3. As appears from FIG. 3 there is a certain play between the leaf spring bundle 23 and each clamp 22.

The leaf springs 23 will keep the holder substantially perpendicular to the push rod 3 or in other words substantially vertical in the shown case irrespective of the position of the hangers. The leaf springs 23 will also keep the different parts in the device together in a substantially play-free manner. Moreover the forces from the shocks and vibrations during normal service of the vehicle will be taken up by the leaf springs 23 so as to prevent the force transmitting means 15 from moving except when required during braking.

Many modifications are possible within the scope of the appended claims. Especially the means for the force transmission and connection between the push rod and the brake block holder may be modified in different respects, the shown and described means being only a preferred embodiment.

I claim:

1. A railway vehicle brake block assembly with means for its suspension including brake block hanger means pivotally attached to a fixed part and to a brake block holder, and with means for connection to a brake force applying such rod, comprising in combination, said brake block hanger means including structure extending from its pivotal attachment position on the fixed part considerably past the center of the brake block holder to a single pivoted position on the brake block holder, and means engaging said push rod with the brake block holder near the center thereof in a position intermediate the pivot positions of the hanger means.

2. A combination as defined in claim 1 wherein the brake block holder is coupled to a curved cradle having a force transmitting member mated therein along the curvature thereof and having a flat surface engaging said push rod.

3. A brake block assembly as defined in claim 2 wherein the curved cradle has an arc with its center aligned with said push rod.

4. A brake block assembly as defined in claim 2 wherein the force transmitting member has bores and is flanked by flat side walls carried by the brake block holder, including retaining means for frictionally keeping the force transmitting member in place in the cradle comprising plungers through the force transmitting member bores biased by spring means into engagement with said flat side walls.

5. A brake block assembly as defined in claim 2 wherein the push rod terminates in a push plate and including spaced apart support members in the brake block holder engaging two ends of resilient holding means which at the mid-portion resiliently engage the push plate.

6. A brake block assembly as defined in claim 5 wherein the curved cradle has extended ends, the push rod includes an axial slot and the resilient holding means comprises a bundle of leaf springs extending through said axial slots, and wherein the support members comprise clamps located in the vicinity of the ends of the cradle.

7. A railway vehicle brake block assembly comprising in combination, a brake unit including means for reciprocally moving a push rod in response to braking forces, a brake block holder for reciprocal movement by said push rod, brake block hanger means pivoted from a fixed part on the vehicle to a single pivoted position on the brake block holder positioned near one end of the brake block holder, and means coupling the push rod to the brake block hanger for reciprocal movement thereof at a position near the center thereof between the two said pivoted positions.

8. A brake block assembly as defined in claim 7 wherein said fixed part comprises a bracket assembly extending from the brake unit substantially parallel to the push rod.

9. A brake block assembly as defined in claim 7 wherein said hanger means is disposed substantially within the height of the brake block holder.

* * * * *